US008974287B2

(12) United States Patent
Burczyk et al.

(10) Patent No.: US 8,974,287 B2
(45) Date of Patent: Mar. 10, 2015

(54) GAMING SYSTEM AND A METHOD OF GAMING

(75) Inventors: Damien Burczyk, Henderson, NV (US); Mark Cass, Las Vegas, NV (US); Bradley Hendricks, Las Vegas, NV (US); Cash Imutan, Henderson, NV (US); Francis Styck, Henderson, NV (US)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 13/437,480

(22) Filed: Apr. 2, 2012

(65) Prior Publication Data

US 2013/0260859 A1 Oct. 3, 2013

(51) Int. Cl.

*A63F 9/24* (2006.01)
*A63F 13/00* (2014.01)
*G07F 17/32* (2006.01)

(52) U.S. Cl.

CPC ................ *A63F 13/00* (2013.01); *G07F 17/32* (2013.01)
USPC ................... 463/20; 463/16; 463/19; 463/22; 463/25; 463/31; 463/32; 463/33

(58) Field of Classification Search

USPC .............................. 463/16–22, 25, 43, 30–33
See application file for complete search history.

(56) References Cited

U.S. PATENT DOCUMENTS

2002/0142821 A1* 10/2002 Baerlocher ..................... 463/16
2003/0100358 A1* 5/2003 Kaminkow ..................... 463/20
2003/0162578 A1* 8/2003 Baerlocher et al. ............. 463/16
2004/0023714 A1* 2/2004 Asdale ............................ 463/22
2005/0059459 A1* 3/2005 Dunn et al. ..................... 463/16
2009/0131145 A1* 5/2009 Aoki et al. ...................... 463/20
2009/0186682 A1* 7/2009 Kim ................................ 463/20

* cited by examiner

*Primary Examiner* — Sunit Pandya
(74) *Attorney, Agent, or Firm* — McAndrews, Held & Malloy, Ltd.

(57) ABSTRACT

A gaming system is disclosed that comprises a selector arranged to select symbols for display in respective first display position areas, and a shutter device disposed in front of the selected symbols and arranged to controllably conceal or reveal at least one of the symbols. The system also comprises a display device disposed in front of the shutter device and arranged to display icons at respective second display position areas. Each second display position area is disposed in alignment with a first display position area, and the display device is controllable so as to modify the degree of transparency of an icon. When the shutter device is controlled so as to reveal a selected symbol and an icon associated with the revealed symbol is modified so as to increase the degree of transparency of the icon, the revealed symbol is viewable through the associated icon.

35 Claims, 9 Drawing Sheets

GAMING SYSTEM AND A METHOD OF GAMING

RELATED APPLICATIONS

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

It is known to provide a gaming system arranged to randomly display several symbols from a predetermined set of symbols and to determine a game outcome such as a game win based on the displayed symbols.

Such gaming systems may commonly be implemented as a stepper machine provided with reels with each reel carrying several symbols of the set, or a video machine wherein selected symbols are displayed on virtual reels on a graphical display device.

However, while such gaming systems provide users with enjoyment, a need exists for alternative gaming systems in order to maintain or increase player enjoyment.

BRIEF SUMMARY OF THE INVENTION

In accordance with a first aspect of the present invention, there is provided a gaming system comprising:

- a selector arranged to select a plurality of symbols from a set of symbols for display in a plurality of respective first display position areas;
- a shutter device disposed in front of the selected symbols and arranged to controllably conceal or reveal at least one selected symbol; and
- a display device disposed in front of the shutter device and arranged to display a plurality of icons at a plurality of respective second display position areas, each second display position area being disposed in alignment with a first display position area;
- the display device being controllable so as to modify the degree of transparency of an icon; and
- wherein when the shutter device is controlled so as to reveal a selected symbol and an icon associated with the revealed symbol is modified so as to increase the transparency of the icon, the revealed symbol is viewable through the associated icon.

In one embodiment, the system comprises at least one reel provided with the set of symbols and the selector is arranged to select at least one of the set of symbols by spinning and subsequently stopping the at least one reel.

In one arrangement, the system comprises a plurality of reels. The reels may be virtual or mechanical reels.

In one embodiment, the system is arranged to facilitate selection by a player of at least one icon, and in response to selection of at least one icon to cause the shutter device to reveal at least one respective symbol aligned with the at least one selected icon.

In one embodiment, the system comprises a touch screen and/or at least one button arranged to facilitate selection by a player of at least one icon.

In one embodiment, the system is arranged to modify the appearance of an icon in response to selection of the icon. In one implementation, the icon is a representation of a closed briefcase, and the icon is modified so as to represent an open briefcase when the icon is selected.

In one embodiment, the shutter device includes at least one shutter electronically actuable such that the shutter is disposable in an open state wherein the shutter device is substantially transparent or a closed state wherein the shutter device is substantially opaque in response to application of an electrical signal.

In an alternative embodiment, the shutter device includes at least one shutter movable between a first position wherein the shutter reveals at least one selected symbol and a second position wherein the shutter conceals the at least one selected symbol.

In one embodiment, the shutter device includes a plurality of shutters. In an embodiment wherein a plurality of reels are provided, each shutter may be associated with a different reel.

In one embodiment, the degree of transparency of a selected icon may be increased by making the selected icon more white than non-selected icons.

In one embodiment, the selected symbol associated with a selected icon determines a prize to be awarded to the player.

In one embodiment, after determining a prize to be awarded to the player, the system is arranged to modify all icons so as to increase the transparency of the icons, and to cause the shutter device to be disposed in the open state so that all selected symbols are viewable through respective icons. In this way, the player is provided with an indication of the prizes that were available and the icons that could have been selected in order to be awarded the respective prizes.

In one embodiment, the gaming system is arranged to present audio and/or video to a player when an icon is selected by the player.

In one embodiment, the gaming system is implemented according to the first aspect of the present invention when a trigger condition occurs during a base game.

In one embodiment, the gaming system is arranged to commence special game mode in response to player input, based on the amount or type of bet placed, or when a special game is purchased by a player.

The trigger condition may be display of a particular symbol, or display of a defined symbol combination.

In accordance with a second aspect of the present invention, there is provided a method of gaming comprising:

- selecting a plurality of symbols from a set of symbols for display in respective first display position areas;
- disposing a shutter device in front of the selected symbols;
- controlling the shutter device to conceal or reveal at least one selected symbol;
- disposing a display device in front of the shutter device;
- displaying a plurality of icons at a plurality of respective second display position areas, each second display position area being disposed in alignment with a first display position area;
- facilitating control of the display device so as to modify the degree of transparency of an icon;
- wherein when the shutter device is controlled so as to reveal a selected symbol and an icon associated with the revealed symbol is modified so as to increase the transparency of the icon, the revealed symbol is viewable through the icon.

In accordance with a third aspect of the present invention there is provided a computer program arranged when loaded into a computer to instruct the computer to operate in accordance with the gaming system of the first aspect.

In accordance with a fourth aspect of the present invention, there is provided a computer readable device having a computer readable program code embodied therein for causing a computer to operate in accordance with the gaming system of the first aspect.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
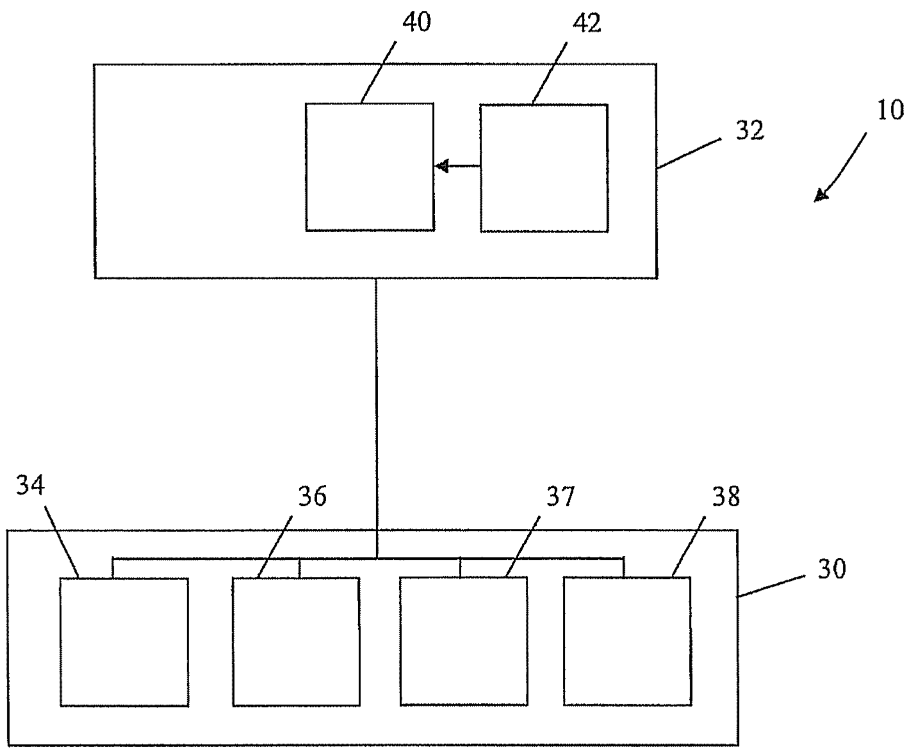
FIG. 1 is a schematic block diagram of components of a gaming system in accordance with an embodiment of the present invention.

The present gaming system operates such that during implementation of a game or during implementation of a feature game of a game having multiple game modes, the interrelationship between a first display arrangement, a second display arrangement and a shutter device disposed between the display arrangements communicates a game outcome to a player. Potential game outcomes are determined according to a set of symbols associated with the first display arrangement, and one or more of the set of symbols is selected and communicated to a player by disposing the shutter device in an open state at least at a display area corresponding to the location of the selected symbol(s).

In one implementation, the first display arrangement comprises a plurality of rotatable symbol bearing reels, and the shutter device is controllable so that parts of the shutter device above each reel are disposable in an open state or a closed state. This ensures that only a particular reel bearing a selected symbol is revealed by the shutter device. Also with this implementation, the second display arrangement includes a video display device arranged to display a plurality of icons, each icon being aligned with a selected symbol of the first display arrangement.

In one implementation, the system is arranged to facilitate selection of an icon by a player, and to communicate to a player a symbol that is associated with the icon by opening the shutter device, or part of the shutter device, and modifying the transparency of the selected icon so that the symbol is at least partially visible through the icon.

In one conventional type of gaming machine, a spinning reel type game comprises a display area including 15 display positions, with each display position including one symbol. The display positions are arranged in five vertically disposed reels, with each reel corresponding to a display position group, and each reel having three visible display positions. After the reels are spun and subsequently stopped, the display positions show a random selection of symbols.

Generally with such games, a plurality of win patterns in the form of win lines are defined which extend across the reels and include one display position from each reel. Typically the symbols that are disposed in a win line are compared with winning symbol combinations defined in a pay table so as to determine whether a player of the game should receive an award. For example, if winning symbol combinations are based on poker hands, a particular prize would be awarded if the win line comprises four aces. Other winning symbol combinations and corresponding prizes may also be defined.

With the present system, a first type of game, such as a spinning reel type game, is implemented on a first gaming arrangement during normal game mode, and a second type of game that uses first and second display arrangements and an intermediate shutter device is implemented on a second gaming arrangement during special game mode.

However, it will be understood that instead of providing a gaming system arranged to implement both the first type of game on a first gaming arrangement and a second type of game on a second gaming arrangement, a gaming system may be provided that implements only the second type of game.

Referring to the drawings, there is shown a schematic block diagram of a gaming system 10 arranged to implement a probabilistic game. The system is of a type including multiple game modes, normal game mode wherein a base game is implemented and special game mode wherein a feature game is implemented.

With the present embodiment, a conventional video spinning reel type base game is implemented during normal game mode on a first gaming arrangement. The set of base symbols used during the base game include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display along a win line, or are displayed according to defined outcome patterns such as scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

Also with the present embodiment, a selection type feature game is implemented during special game mode on a second gaming arrangement. The set of feature symbols used may include representations of playing cards, shapes, or any other type of symbols, and in one arrangement each symbol represents a prize to be awarded to a player. With this type of game, therefore, selection of a feature symbol by a player determines the prize that the player receives.

With the selection type game of the present embodiment, a player is presented with multiple icons and selection of one or more of the icons causes a symbol associated with each of the selected icons to become visible, thereby communicating to the player the relevant prize awarded.

Referring to FIG. 1, a schematic diagram of components of a gaming system 10 in accordance with the present embodiment is shown. The components comprise a player interface 30 and a game controller 32. The player interface 30 is arranged to enable interaction between a player and the gaming system and for this purpose includes input/output components required for the player to enter instructions and play the game.

Components of the player interface 30 may vary but will typically include a credit mechanism 34 to enable a player to input credits and receive payouts, at least first and second display arrangements 36, 37, and a game play mechanism 38 arranged to enable a player to input game play instructions.

The game controller 32 is in data communication with the player interface 30 and typically includes a processor 40 arranged to process game play instructions and output game player outcomes to one or more of the displays 36, 37. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

Figure 2:
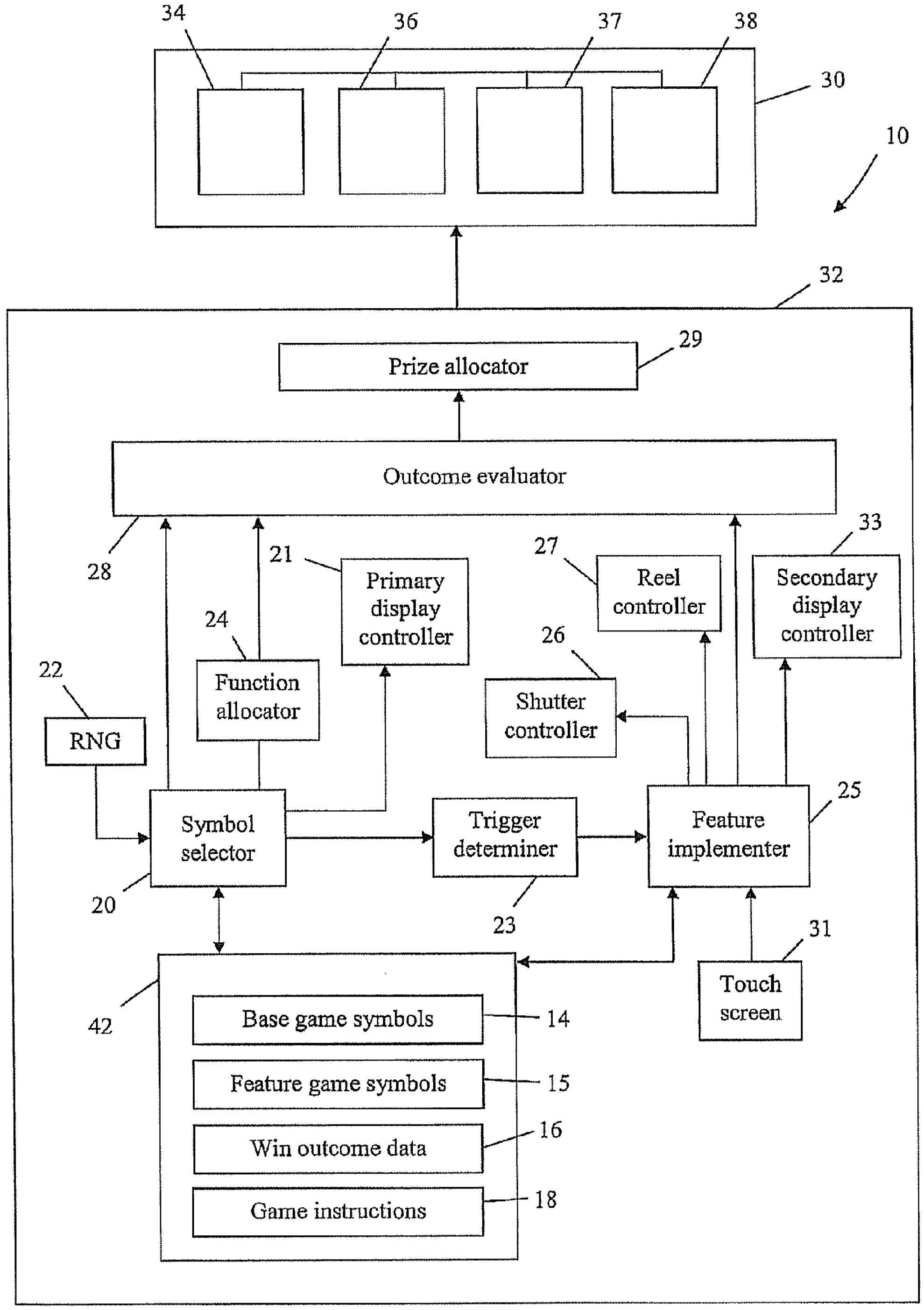
FIG. 2 is a schematic block diagram of functional components of a gaming system in accordance with an embodiment of the present invention.

A functional diagram illustrating operative components of the game controller 32 is shown in FIG. 2.

The memory 42 is arranged to store base game symbols data 14, feature game symbols data 15, win outcome data 16 indicative of win condition requirements for base and feature games, and game instruction data 18 indicative of game instructions usable by the gaming machine 10 to control operation of the base and feature games.

The game controller 32 includes a symbol selector 20 which is arranged during normal game mode to select several symbols for display to a player in a plurality of display positions on a plurality of reels of the first gaming arrangement, and a primary display controller 21 arranged to control a video display device so that the reels stop with the selected symbols displayed. In this example, the selection carried out by the symbol selector 20 is made using a random number generator 22.

It will be appreciated that the random number generator 22 may be of a type which is arranged to generate pseudo random numbers based on a seed number, and that in this specification the term "random" will be understood accordingly to mean truly random or pseudo random.

With this embodiment, the game controller 32 also comprises a trigger determiner 23 arranged to determine whether a trigger condition exists, and a feature implementer 25 arranged to implement a feature game when a trigger condition is determined to exist.

During a feature game, the feature implementer 25 interacts with a shutter controller 26, a reel controller 27, a touch screen 31, and a secondary display controller 33.

The shutter controller 26 is arranged to control an electronic shutter device so as to dispose the shutter device, or selected parts of the shutter device, in a closed state wherein the shutter device is substantially opaque, or an open state wherein the shutter device is substantially transparent.

The reel controller 27 is arranged to control operation of several rotatable reels, in this example mechanical reels, and in particular to control the stopping positions of the mechanical reels so that selected symbols disposed on the reels are potentially viewable when the shutter device is disposed in the open state.

The touch screen 31 is used in this embodiment to facilitate selection of one or more icons displayed on the secondary display, as described in more detail below.

The secondary display controller 33 is arranged to control a secondary display of the secondary gaming arrangement so that selectable icons are displayed on the secondary display. The secondary display controller 33 is also arranged so that the appearance of one or more of the icons is modified according to game play, for example to indicate selection of an icon or to enable a selected reel symbol to be viewed by a player, as described below in more detail.

The game controller 32 also comprises an outcome evaluator 28 which, in accordance with game instructions 18, determines game outcomes based on the symbols selected for display to the player by the symbol selector 20 during normal game mode after all reels have stopped spinning, and during special game mode determines game outcomes based on the symbols selected using the mechanical reels and the icon(s) selected by a player.

The game controller 32 also comprises a prize allocator 29 arranged to allocate a prize to a player when a winning outcome exists.

In the present embodiment, the symbol selector 20, the trigger determiner 23, the function allocator 24, the feature implementer 25, the primary display controller 21, the shutter controller 26, the reel controller 27, the secondary display controller 33, the outcome evaluator 28, and the prize allocator 29 are at least partly implemented using the processor 40 and associated software although it will be understood that other implementations are envisaged.

The gaming system 10 can take a number of different forms.

In a first form, a player operable gaming device in the form of a stand alone gaming machine is provided wherein all or most components required for implementing the game are present in the gaming machine.

In a second form, a distributed architecture is provided wherein some of the components required for implementing the game are present in a player operable gaming device and some of the components required for implementing the game are located remotely relative to the gaming device. For example, a "thick client" architecture may be used wherein part of the game is executed on a player operable gaming terminal and part of the game is executed remotely, such as by a gaming server; or a "thin client" architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming device is networked to a device server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
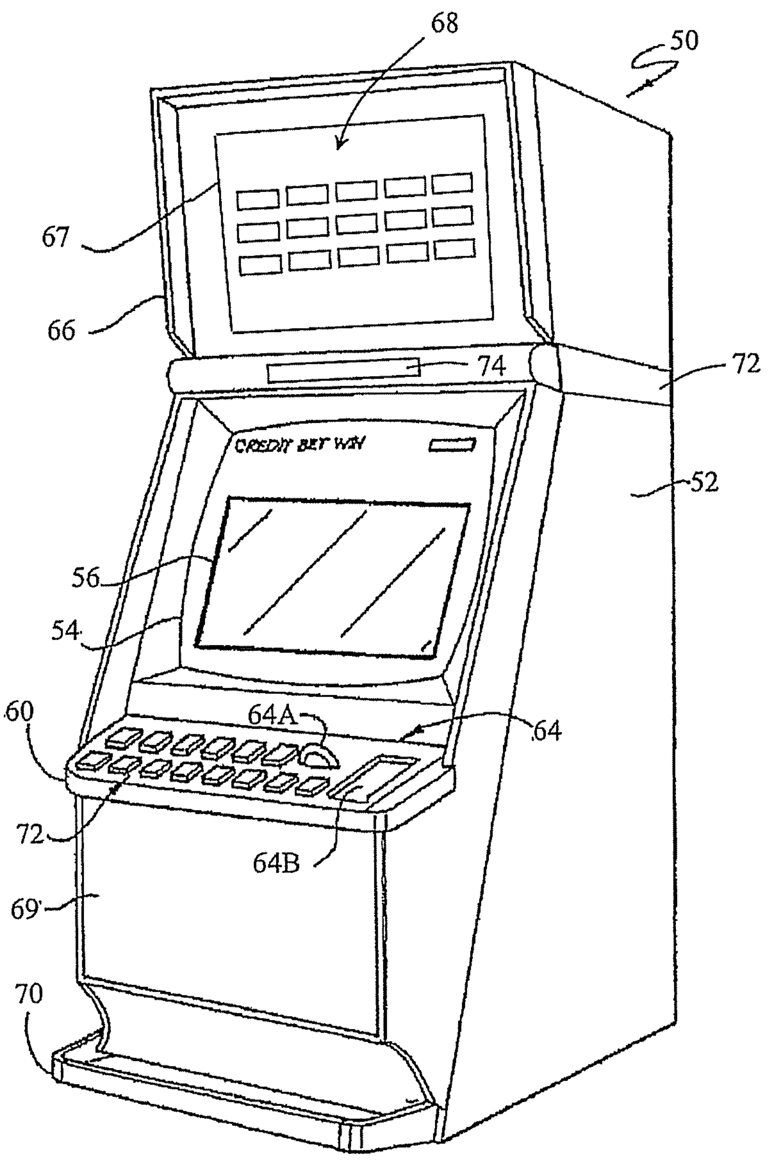
FIG. 3 is a diagrammatic representation of a gaming system in accordance with an embodiment of the present invention with the gaming system implemented in the form of a stand alone gaming machine.

A gaming system in the form of a stand alone gaming machine 50 is illustrated in FIG. 3. The gaming machine 50 includes a console 52 having a primary gaming arrangement 54 that is used to display a base game 56. A mid-trim 60 of the gaming machine 50 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 houses a secondary gaming arrangement 67 that is used to implement a feature game 68.

Further artwork and/or information may be provided on a front panel 69 of the console 52. A coin tray 70 is mounted beneath the front panel 69 for dispensing cash payouts from the gaming machine 50.

Figure 4:
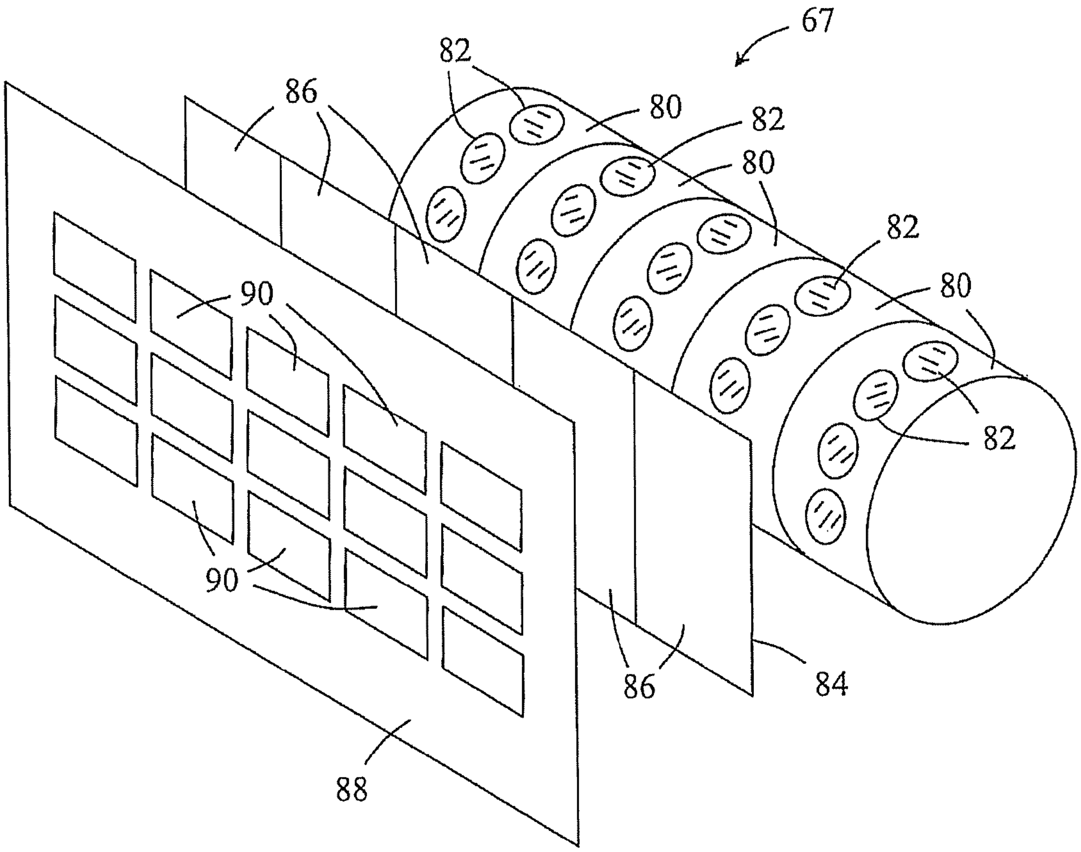
FIG. 4 is a diagrammatic representation of a secondary display arrangement of the gaming system shown in FIG. 3.

As shown more particularly in FIG. 4, the secondary gaming arrangement 67 comprises several rotatable mechanical reels 80 that are controllable using the reel controller 27 to stop at a selected position. Each of the reels 80 has a plurality of symbols 82. The stopping positions for the reels 80 are determined by the feature implementer 25, although the symbol selector 20 may as an alternative be used for this purpose.

Disposed in front of the reels 80 is a shutter device 84 disposable in an open state or a closed state. In the open state, the symbols 82 on the reels 80 are revealed, and in the closed state the symbols 82 are concealed by the shutter device 84. The shutter device 84 may include multiple shutters 86 each of which is associated with one of the reels 80 and each of which is individually controllable such that individual reels 80 may concealed or revealed according the state of the shutter 86.

In this example, the shutter device 84 is of electronic type and is therefore electronically controllable to dispose the shutter device 84 in the closed or open state. However, it will be understood that other arrangements are envisaged. For example, the shutter device may be mechanically implemented, for example such that the shutter device or respective parts of the shutter device are movable between a position wherein at least part of the reels is concealed by the shutter device and a position wherein at least part of the reels is revealed.

The secondary gaming arrangement 67 also includes a video display device 88, which may incorporate a liquid crystal display, a plasma screen, or any other suitable video display unit. The video display device 88 is disposed in front of the shutter device 84 and is arranged to display a plurality of icons 90. The icons 90 are aligned with the reels 80 such that when the shutter device 84 is in the open state, each icon 90 aligns with a symbol 82 on one of the reels 80.

The video display device 88 may incorporate a touch screen that is substantially transparent. During use, the touch screen may be used to receive inputs from a player, for example so as to enable a player to select one or more of the icons 90 during a feature game.

A player marketing module (PMM) 72 having a display 74 is connected to the gaming machine 50. The main purpose of the PMM 72 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 5:
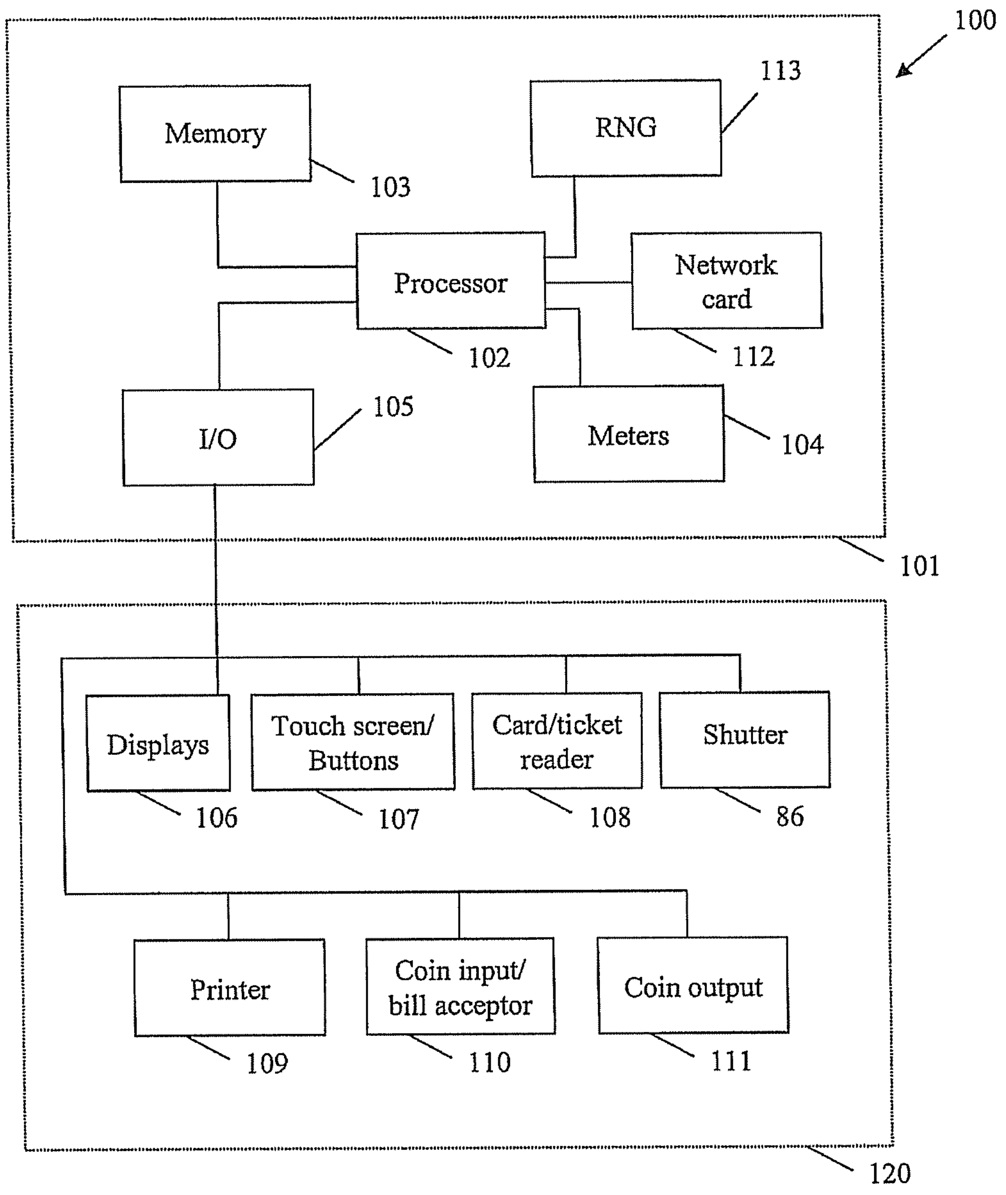
FIG. 5 is a schematic block diagram of operative components of the gaming machine shown in FIG. 3.

FIG. 5 shows a block diagram of operative components of a gaming device 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 6:
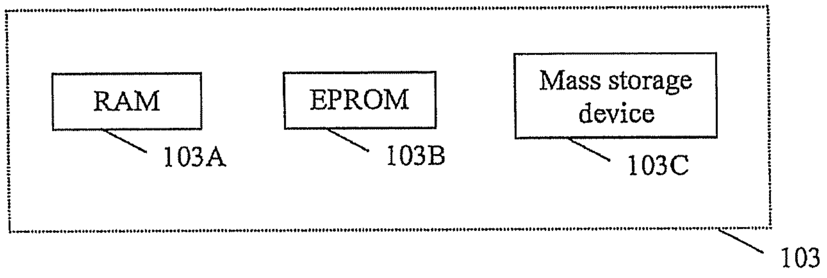
FIG. 6 is a schematic block diagram of components of a memory of the gaming machine shown in FIG. 3.

FIG. 6 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 5, the peripheral devices that communicate with the game controller 101 comprise one or more displays 106; a touch screen and/or bank of buttons 107 including at least one input device, such as at least one button, to enable a player to select an icon; a card and/or ticket reader 108; a printer 109; a bill acceptor and/or coin input mechanism 110; a coin output mechanism 111; and a shutter 86. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106,107,108,109,110,111 may be provided remotely from the game controller 101.

Figure 7:
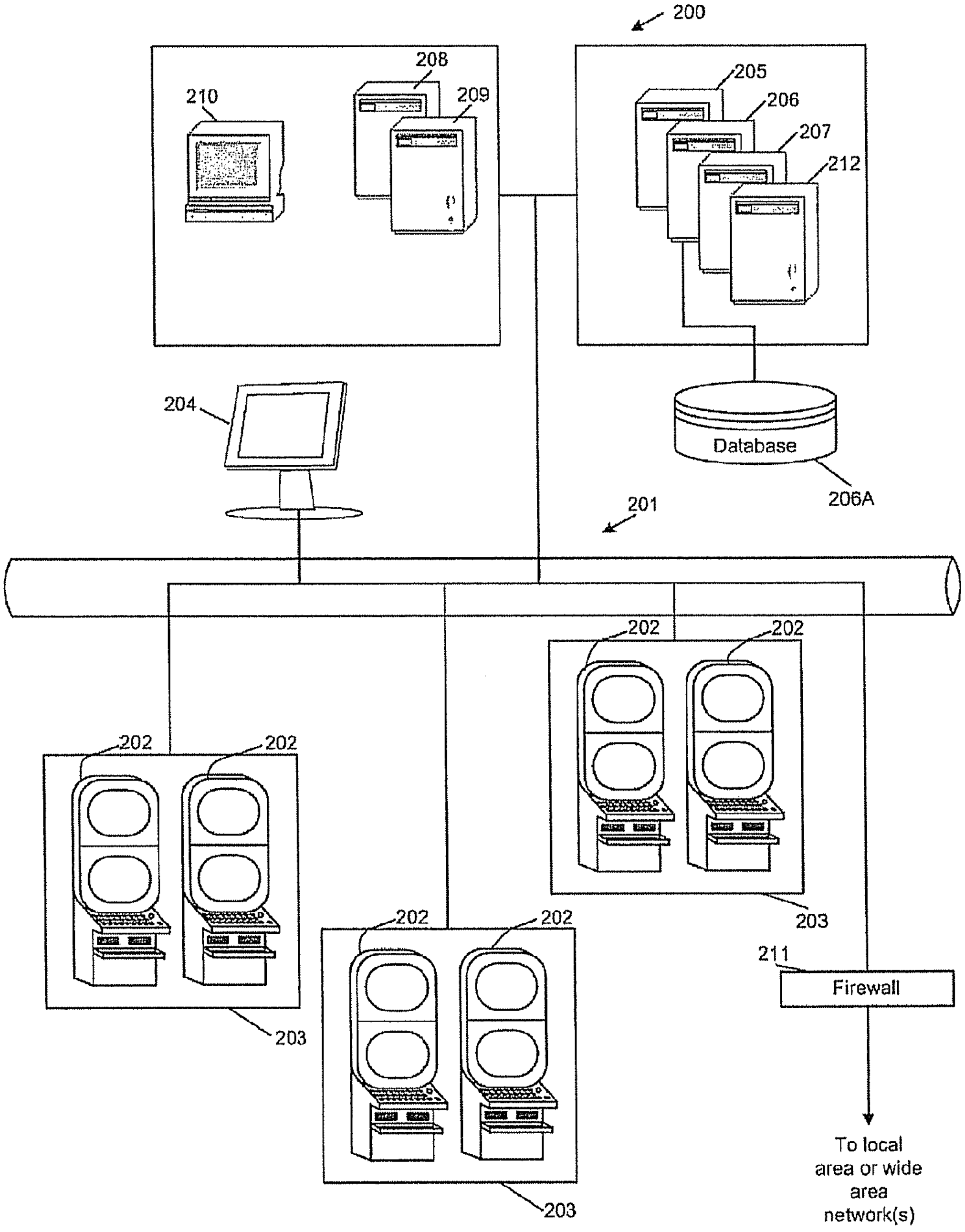
FIG. 7 is a schematic diagram of a gaming system in accordance with an alternative embodiment of the present invention wherein the gaming system is implemented over a network.

FIG. 7 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40,100 shown in FIGS. 3 and 4, or may have simplified functionality depending on the requirements for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine.

Alternatively, a separate random number generator server could be provided.

Examples of specific implementations of the gaming system will now be described in relation to a stand alone gaming machine 50 although it will be understood that implementation may also be carried out using other gaming system architectures such as a network architecture of the type shown in FIG. 7.

The gaming system is operable in normal game mode and special game mode and may be arranged to commence special game mode when a predetermined game outcome occurs. Special game mode may comprise one or more free games.

Special game mode may commence automatically on the basis of a game event occurring during a base game, such as display of a particular symbol, based on game outcomes determined by the gaming system, or may be prompted by a player pressing a button on the gaming system 10 after the player has identified that a game outcome corresponding to special game mode requirements has occurred.

The gaming system 10 may also be arranged so as to determine eligibility for special game mode, for example based on the amount or type of bet placed, based on particular time periods and so on.

Special game mode may also be arranged to commence when a special game is purchased by a player.

Figure 8:
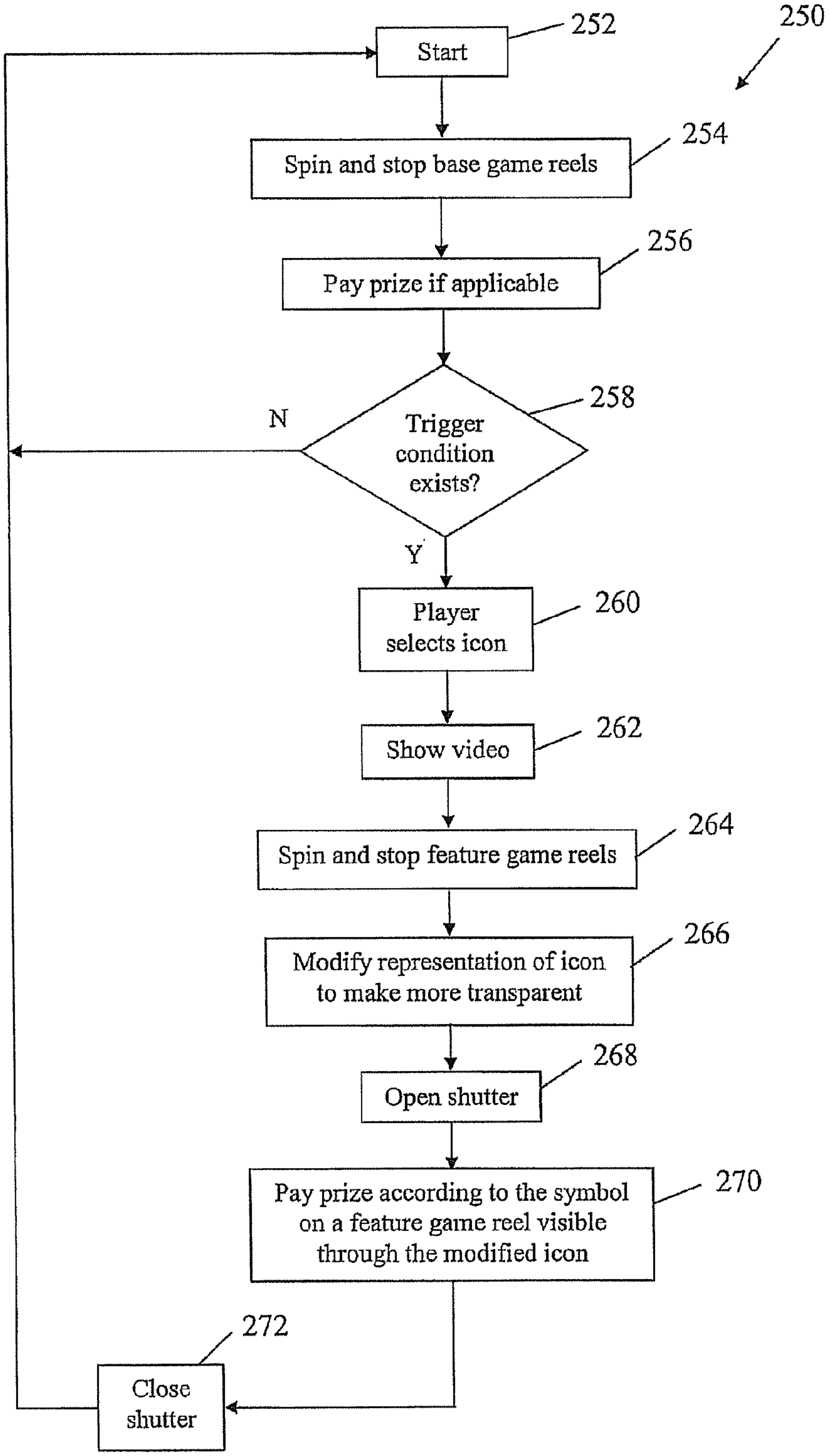
FIG. 8 is a flow diagram illustrating game play of a gaming system in accordance with an embodiment of the present invention.

A specific example will now be described in relation to flow diagram 250 shown in FIG. 8, which illustrates steps 252 to 272 of a method of gaming implemented by the gaming system.

In this example, the gaming system comprises a primary gaming arrangement 54 that is used to implement a base game. During the base game, five virtual reels are rotated and subsequently stopped 254 to display standard symbols and one or more function symbols. Win outcomes are determined on the basis of the symbols visible at the display positions when the reels stop.

Typically, a player will purchase or otherwise obtain win entitlements such as several win lines which are used in the game to determine win outcomes. If the displayed symbols on the reels have symbols associated with a winning combination such as a winning combination disposed on a win line, the player wins a prize.

The outcome generator 28 determines whether the symbols displayed correspond to a winning outcome and, if a winning outcome exists, a prize associated with the winning outcome is awarded 256 to the player. This determination is made by comparing the displayed symbols with a pay table or similar.

If a predefined game outcome occurs 258 during the base game, such as display of a defined combination of symbols, the gaming system implements a feature game.

During implementation of the feature game, the secondary gaming arrangement 67 is used instead of the primary gaming arrangement 54.

Figure 9:
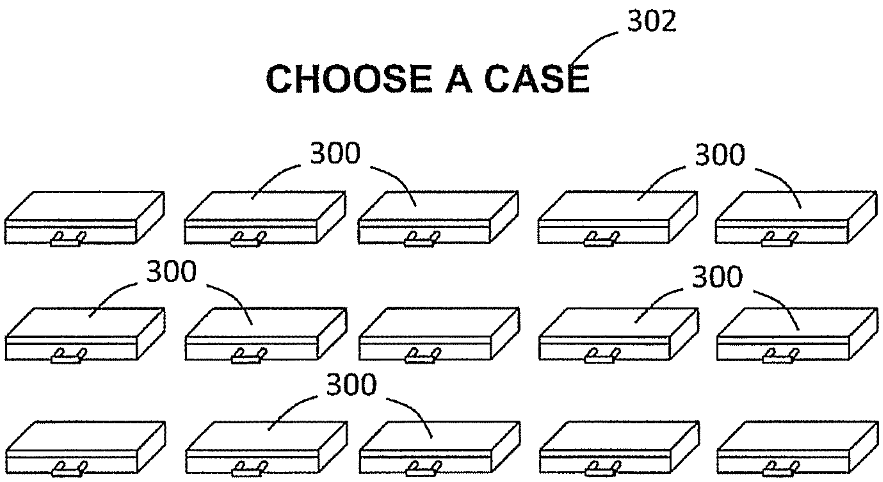
FIGS. 9 to 12 are diagrammatic representations of the secondary display arrangement of a gaming system shown during implementation of a game.

As shown in FIG. 9, at commencement of the feature game, the video display device 88 is controlled by the secondary display controller 33 to display a plurality of icons 300, in this example representations of briefcases, and the player is invited by suitable text 302 to select one of the icons 300.

Figure 10:
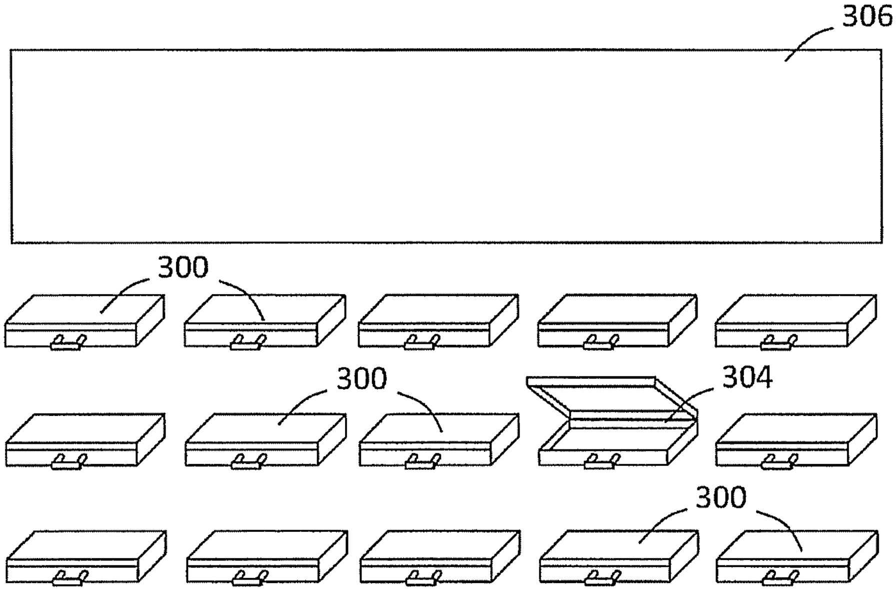

After the player has selected one of the icons 300, for example by touching the video display device 88, the appearance of the selected icon is modified, in the present example wherein each icon 300 represents a briefcase, by showing a modified icon 304 representing the briefcase open, as shown in FIG. 10. Selection of an icon 300 may also cause audio and/or video to be presented 262 to the player, and in this example video content is shown in a window 306.

The reel controller 27 then causes the reels 80 to spin and subsequently stop 264 with 3 symbols 82 on each reel 80 facing the shutter device 84, and the representation of the selected icon 304 is modified so as to make the selected icon 304 more transparent than the icons 300 that have not been selected. This may be achieved for example by making the selected icon more white than the non-selected icons 300. At the same time or subsequently, the shutter device 84 is caused to move to the open state, or a shutter 86 of the shutter device 84 that is aligned with the selected icon 304 is caused to move to the open state.

It will be understood that by making the selected icon 304 more transparent then non-selected icons 300 and opening a shutter 86 beneath the selected icon 304, a selected symbol 82 on one of the reels 80 that is disposed behind and in alignment with the selected icon 304 becomes visible and appears inside the selected icon 304.

Figure 11:
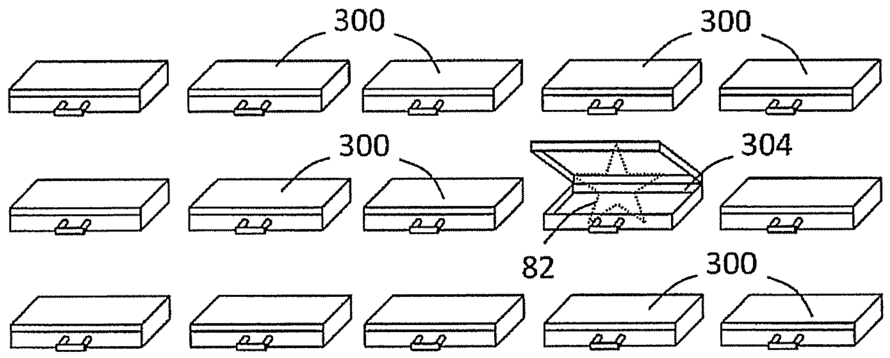

As shown in FIG. 11, the selected symbol 82 visible inside the selected icon 304 is a star symbol. The outcome evaluator 28 and the prize allocator 29 determine the prize associated with a star symbol and award the prize to the player.

Figure 12:
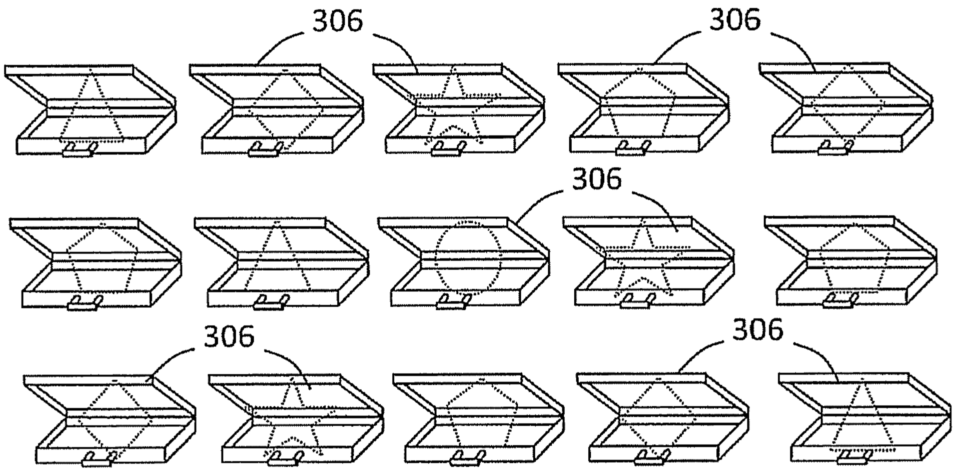

As shown in FIG. 12, after the prize to be awarded to the player is determined, all icons are modified to represent open briefcases 306 and so as to make the icons at least partially transparent, and the shutter device 84 is disposed in an open state so that all of the selected symbols 82 are shown in alignment with their respective icons. In this way, the player is provided with an indication of the prizes that were available and the icons that could have been selected in order to be awarded the respective prizes.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are determined to be within the scope of the present invention.

The claims defining the invention are as follows:

1. A gaming system comprising:

a selector configured to select a plurality of symbols from a set of symbols and to display the plurality of selected symbols;

a shutter device disposed in front of the displayed selected symbols and configured to controllably conceal or reveal at least one of the displayed selected symbols; and a display device disposed in front of the shutter device and configured to display a plurality of fixed icons that are each selectively displayable in one of two states including a closed state and an open state, each of said fixed icons being displayed in alignment with one of said displayed selected symbols, each of said fixed icons (a) having a plurality of degrees of transparency and (b) being initially displayed in the lowest degree of transparency; and wherein said shutter device is controllable so as to reveal one of said displayed selected symbols; and wherein said display device is further configured to change said icons from a said closed state to a said open state and to increase the degree of transparency of said at least one icon associated with said one of said selected symbols to reveal said one of said selected symbols through said icon when in said open state.

2. A gaming system as claimed in claim 1, wherein said selector comprises at least one reel provided with the set of symbols, wherein the selector is configured to select at least one of the set of symbols by spinning and subsequently stopping the at least one reel.

3. A gaming system as claimed in claim 2, wherein said selector comprises a plurality of reels.

4. A gaming system as claimed in claim 2, wherein the at least one reel comprises at least one virtual reel.

5. A gaming system as claimed in claim 2, wherein the at least one reel comprises at least one mechanical reel.

6. A gaming system as claimed in claim 1, wherein the system is configured to facilitate selection by a player of at least one of said plurality of icons, and in response to selection of at least one icon to cause the shutter device to reveal the displayed selected symbol aligned with the selected at least one icon.

7. A gaming system as claimed in claim 6, wherein said display device comprises a touch screen configured to facilitate selection by a player of at least one icon.

8. A gaming system as claimed in claim 6, and further comprising at least one button configured to facilitate selection by a player of at least one icon.

9. A gaming system as claimed in claim 6, wherein the system is configured to modify the appearance of an icon in response to selection of the icon.

10. A gaming system as claimed in claim 1, wherein the icon is a representation of a briefcase, and the icon is selectively displayable as a closed briefcase when the icon is in the closed state and an open briefcase when the icon is in the open state.

11. A gaming system as claimed in claim 1, wherein the shutter device includes at least one shutter electronically actuable such that the shutter is disposable in an open state wherein the shutter device is substantially transparent or in a closed state wherein the shutter device is substantially opaque.

12. A gaming system as claimed in claim 1, wherein the shutter device includes at least one shutter movable between a first position wherein the shutter reveals at least one selected symbol and a second position wherein the shutter conceals the at least one selected symbol.

13. A gaming system as claimed in claim 3, wherein the shutter device includes a plurality of shutters, each shutter being associated with a different reel.

14. A gaming system as claimed in claim 6, wherein the degree of transparency of a selected icon is increased by making the selected icon more white than non-selected icons.

15. A gaming system as claimed in claim 6, wherein the selected symbol associated with a selected icon determines a prize to be awarded to the player.

16. A gaming system as claimed in claim 1, wherein the display is configured such that after determining a prize to be awarded to the player, all icons are modified so as to increase the transparency of the icons, and the shutter device is disposed in the open state so that all selected symbols are viewable through respective icons.

17. A gaming system as claimed in claim 6, wherein the gaming system is configured to present audio and/or video to a player when an icon is selected by the player.

18. A method of gaming for use with a gaming system having (1) a set of symbols for display, (2) a shutter device disposed in front of the symbols when displayed, and (3) a display device disposed in front of said shutter device, the method comprising:

selecting a plurality of symbols from said set of symbols for display and displaying the selected plurality of symbols;

revealing at least one of the displayed selected symbols;

displaying a plurality of fixed icons that are selectively displayable in one of two states including a closed state and an open state on said display device, including displaying each of said fixed icons displayed in alignment with one of the displayed said selected symbols, and displaying each of said fixed icons displayed initially in the lowest degree of transparency; and in response to said shutter device being controlled so as to reveal one of said selected symbols, changing via said display device the icon aligned with said one of said selected symbols from the closed state to the open state and increasing via said display device a degree of transparency of the icon aligned with said one of said selected symbols to reveal said one of said selected symbols through the aligned icon in said open state.

19. A method as claimed in claim 18, and further comprising using at least one reel provided with the set of symbols, and wherein said selecting includes spinning and subsequently stopping the at least one reel.

20. A method as claimed in claim 19, comprising using a plurality of reels.

21. A method as claimed in claim 19, wherein the at least one reel comprises at least one virtual reel.

22. A method as claimed in claim 19, wherein the at least one reel comprises at least one mechanical reel.

23. A method as claimed in claim 18, comprising facilitating selection by a player of at least one of said plurality of icons, and in response to selection of said at least one icon causing the shutter device to reveal the displayed selected symbol aligned with the selected said at least one icon.

24. A method as claimed in claim 23, wherein said facilitating selection by a player of at least one of said plurality of icons includes providing a touch screen.

25. A method as claimed in claim 23, wherein said facilitating selection by a player of at least one of said plurality of icons includes providing at least one button for use to facilitate selection by a player of at least one icon.

26. A method as claimed in claim 23, comprising modifying the appearance of an icon in response to selection of the icon.

27. A method as claimed in claim 26, wherein the said displaying a plurality of fixed icons includes displaying each of the plurality of fixed icons as a closed briefcase, and wherein said modifying the appearance of the selected icon includes modifying the selected icon so as to represent an open briefcase.

28. A method as claimed in claim 18, wherein the shutter device includes at least one shutter electronically actuable such that the shutter is disposable in an open state wherein the shutter device is substantially transparent or a closed state wherein the shutter device is substantially opaque in response to application of an electrical signal.

29. A method as claimed in claim 18, wherein the shutter device includes at least one shutter movable between a first position wherein the shutter reveals at least one selected symbol and a second position wherein the shutter conceals the at least one selected symbol.

30. A method as claimed in claim 20, wherein the shutter device includes a plurality of shutters, each shutter being associated with a different reel.

31. A method as claimed in claim 18, comprising increasing the degree of transparency of a selected icon by making the selected icon more white than non-selected icons.

32. A method as claimed in claim 18, comprising determining a prize to be awarded to the player based on the selected symbol associated with a selected icon.

33. A method as claimed in claim 32, wherein after determining a prize to be awarded to the player, modifying all icons including increasing the transparency of the icons, and causing the shutter device to be disposed in the open state so that all selected symbols are viewable through respective icons.

34. A method as claimed in claim 18, comprising presenting audio and/or video to a player when an icon is selected by the player.

35. A computer readable device having a computer readable program code embodied therein for causing a computer to operate in accordance with the gaming system comprising:

a selector configured to select a plurality of symbols from a set of symbols for display;

a shutter device disposed in front of the selected symbols and configured to controllably conceal or reveal at least one selected symbol; and a display device disposed in front of the shutter device and configured to display a plurality of fixed icons that are each selectively displayable in one of two states including a closed state and an open state and that align with said selected symbols, each of said fixed icons (a) having a plurality of degrees of transparency and (b) being initially displayed in the lowest degree of transparency; and wherein when the shutter device is controlled so as to reveal one of said selected symbols, said display device is further configured to change said icons from a said closed state to a said open state and to increase a degree of transparency of said at least one icon associated with said one of said selected symbols to reveal said one of said selected symbols through said icon when in said open state.

* * * * *